United States Patent
Grubb et al.

[11] Patent Number: 5,805,621
[45] Date of Patent: Sep. 8, 1998

[54] FIBER MULTIMODE LASER WITH REDUCED NOISE

[75] Inventors: Stephen Gregory Grubb, Fremont, Calif.; Clifford Headley, North Plainfield, N.J.; Martin Heinrich Muendel, Cambridge, Mass.; Janet Renee Pedrazzani, Summit, N.J.; Bennett H. Rockney, Westford, Mass.; Thomas A. Strasser, Chatham, N.J.

[73] Assignee: Lucent Technologies, Inc., Murray Hill, N.J.

[21] Appl. No.: 747,946

[22] Filed: Nov. 12, 1996

[51] Int. Cl.$^6$ ........................................................ H01S 3/10
[52] U.S. Cl. ................................................. 372/6; 372/102
[58] Field of Search ......................................... 372/6, 102

[56] References Cited

U.S. PATENT DOCUMENTS 5,668,821  9/1997  Hodgson et al. ............................. 372/6

*Primary Examiner*—James W. Davie
*Attorney, Agent, or Firm*—Mathews, Collins, Shepherd Gould, P.A.

[57] ABSTRACT

Applicants have discovered that the intermodal beat noise of a fiber multimode laser can be substantially reduced by providing the fiber with an output coupler of broadened bandwidth. In a preferred embodiment, a reduced-noise, high power light source comprises a cladding pumped fiber laser having a chirped output grating. Experiments show that increasing the output bandwidth from 0.254 to 0.577 nm reduces the relative intensity-to-noise ratio 10 dB in a Nd-doped fiber laser. Increasing the bandwidth from 0.2 nm to 0.3 nm in a Yb-doped laser similarly reduces the noise by 12 dB.

10 Claims, 2 Drawing Sheets

FIBER MULTIMODE LASER WITH REDUCED NOISE

FIELD OF THE INVENTION

This invention relates to rare-earth doped fiber lasers and, in particular, to fiber multimode lasers having reduced noise in their optical outputs.

Rare-earth doped fiber lasers are useful in a wide variety of communications devices. Such lasers typically comprise a length of optical fiber doped with a small percentage of rare-earth elements such as Nd or Yb. After they are exposed to light of an appropriate pump frequency, such fibers are capable of stimulated emission of coherent light at a lower frequency. These fiber lasers are highly useful as pumps for optical amplifiers in optical telecommunications systems and as controllable light sources in laser printers.

Cladding pumped optical lasers are particularly useful for high power applications. Cladding pumped lasers are designed so that the outer cladding of the fiber acts as a waveguide to the pumping light while the rare earth-doped inner core acts as a waveguide to the stimulated emission. In essence, the pumping light reflects from the cladding-polymeric interface, and the stimulated emission reflects from the core-cladding interface. The advantage of the cladding pumped fiber laser is that high levels of pumping energy—typically hundreds of times larger than conventional fiber layers—can be coupled within the cladding. Such lasers are particularly useful for printers and for Raman laser amplifiers.

One difficulty with rare earth-doped fiber lasers is that they are typically multimode. As a consequence, their output signals are subject to noise generated by beating between modes. FIG. 1 below illustrates peaks of intermodal beat noise in a typical multimode laser. Such lasers typically exhibit rms noise levels in excess of 15% in the range of electronic control signals (0.1 Hz to 100 MHz). But important potential applications, including some printers, require a laser light source with substantially lower noise. One printer application, for example, requires rms noise less than 1% from 0.1 Hz to 100 MHz. Accordingly there is a need for a fiber multimode laser with reduced noise.

SUMMARY OF THE INVENTION

Applicants have discovered that the intermodal beat noise of a fiber multimode laser can be substantially reduced by providing the fiber with an output coupler of broadened bandwidth. The broadened coupler increases the laser bandwidth and reduces the noise in the frequency range of interest. In a preferred embodiment, a reduced-noise, high power light source comprises a cladding pumped fiber laser having a chirped output grating. Experiments show that increasing the output bandwidth from 0.254 to 0.577 nm reduces the relative intensity-to-noise ratio 10 dB in a Nd-doped fiber laser. Increasing the output bandwidth from 0.2 nm to 0.3 nm in a Yb-doped laser reduces the noise by 12 dB.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

This description is divided into two parts. Part I describes applicants' device for reducing intermodal beat noise in multimode fiber lasers, and Part II sets forth applicants' current best theory of how their device works.

I. The Problem of Noise and Its Reduction

Figure 1:
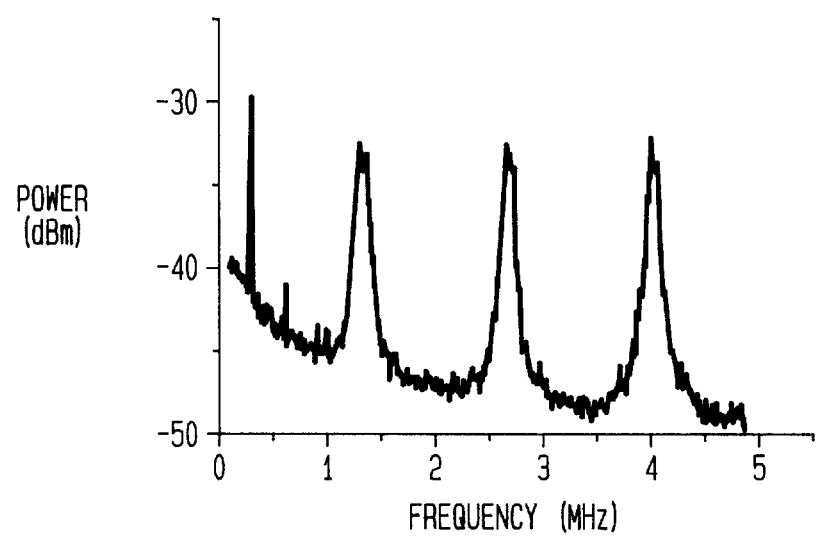
FIG. 1 is a typical example of the noise spectrum from a conventional cladding pumped fiber laser.

Referring to the drawings, FIG. 1 is useful in illustrating the problem to which the invention is directed. FIG. 1 is a typical example of the noise spectrum for a cladding pumped fiber laser. The first two peaks below 1 MHz correspond to the laser relaxation oscillation frequencies. The peak at about 1.4 MHz and the subsequent peaks with the same frequency spacing correspond to the beat frequency of longitudinal modes. This pattern of noise peaks repeats itself at higher frequencies beyond 5 MHz. In general, the intermodal beat noise is the dominant noise source in multimode rare earth fiber lasers whose spectral width encompasses more than 5 longitudinal modes.

Figure 2:
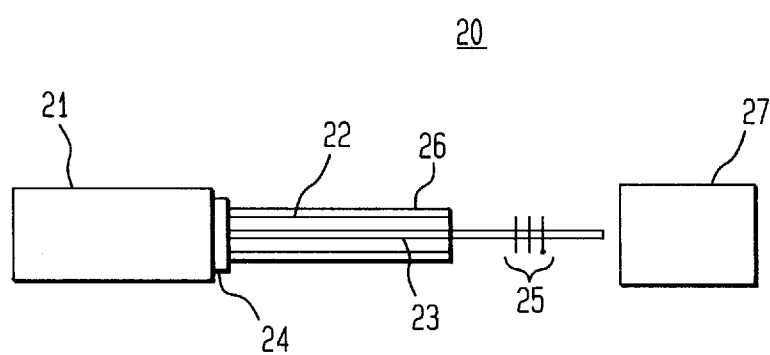
FIG. 2 is a schematic diagram of a cladding pumped fiber laser in accordance with a preferred embodiment of the invention.

Applicants have determined that this intermodal beat noise can be significantly reduced by broadening the spectral width of the laser output coupler. FIG. 2 is a schematic diagram of a preferred reduced-noise laser 20 in an experimental set up to measure the relative intensity-to-noise (RIN) ratio. Specifically, the laser 20 comprises source 21 of pumping light and a rare earth-doped fiber comprising cladding 22 and a rare-earth doped core 23 disposed within an optical cavity formed by an input coupler 24 and an output coupler 25. The fiber advantageously includes an outer polymeric coating 26 for environmental protection.

In conventional practice, the output coupler of a rare earth-doped fiber laser designed to lase at a center wavelength $\lambda$ is chosen to produce lasing in as narrow as possible a spectrum about $\lambda$. Typically, the full width at half maximum is about 0.20 nm. The output coupler is typically an unchirped grating having a reflective spectrum with a bandwidth of less than 0.20 nm. In accordance with the invention, the reflective spectrum of the output coupler is broadened by at least 10% to exceed 0.22 nm and reduce the intermodal beat noise by at least 3 dB. Preferably the coupler output is broadened by at least 300% to exceed 0.60 nm and reduce the noise by at least 10 dB.

Advantageously the arrangement is configured as a cladding pumped fiber laser (CPFL) wherein source 21 pumps into cladding 22. The pumping source is preferably an array of light emitting diodes such as High Power Diode unit available from SDL Inc., San Jose Calif. The fiber can be doped with 0.5 weight % of $Nd_2O_3$ in the core, and the input coupler 24 can be a broadband microsheet with an antireflection coating at the pump wavelength. The structural parameters of the preferred laser are set forth in Table 1.

TABLE 1

| Fiber length | 70 m |
|---|---|
| Core refractive index (n) | 1.46 |
| Lasing Wavelength (λ) | 1064 nm |
| Pump Wavelength | 810 nm |
| Optical Bandwidth ($B_o$) | 53 GHz (0.2 nm) |

In this specific embodiment the pump wavelength was 810 nm, the stimulated emission was 1060 nm and the output coupler was a grating with a linear chirp of 4.06 nm/cm. Advantageously the grating is made by the process described in the United States patent application by G. Kohnke et al. entitled "Method and Apparatus For Making Continuous Chirped Fiber Bragg Gratings" filed Nov. 4, 1996 and designated Ser. No. 08/740,745, which is incorporated herein by reference. Alternatively, it can be a linear or non-linear chirped grating such as described in Q. Zhang et al., "Linearly and Nonlinearly Chirped Bragg Gratings Fabricated on Curved Fibers", *Optics Letters*, Vol. 20, No. 10, p. 1112, (1995) which is incorporated herein by reference. It can also be a step-chirped grating such as described in P. F. Kashyap et al., "Novel Method of Producing All Fiber Photoinduced Chirped Gratings", *Electronics Letters*. Vol. 30, No. 12, p. 996–97 (Jun. 9, 1994), which is also incorporated herein by reference. The linear chirped and step-chirped gratings are preferred in order to eliminate potential mode locking.

Figure 3:
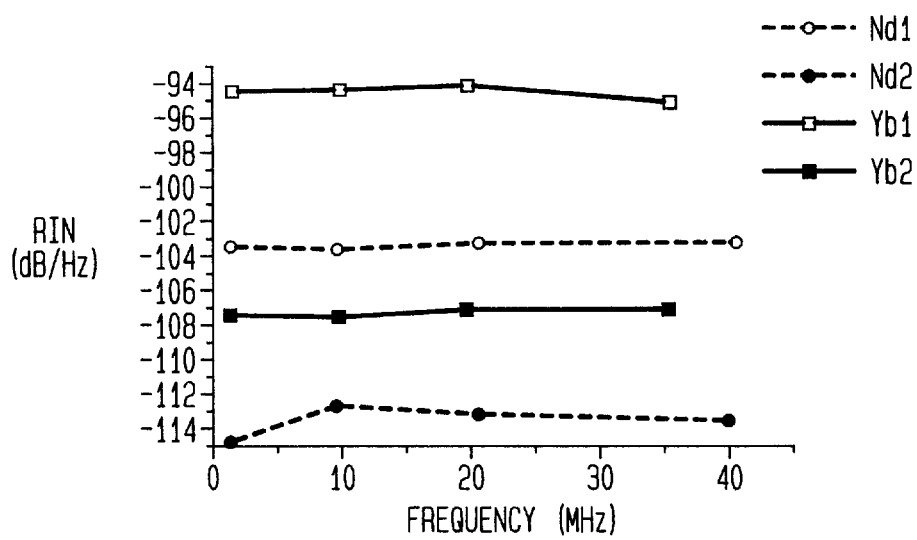
FIG. 3 shows the relative intensity-to-noise ratio at peak noise power frequencies for four fiber lasers with various output couplers.

For experimental measurement of noise, the output was coupled into an analyzer 26 such as a HP 71400C Lightwave System Analyzer which displays a plot of the RIN versus frequency. In one set of measurements (designated Nd 1) a conventional narrow band grating (0.157 nm width) was used as a reference. The second set of measurements (Nd 2) was made with the chirped grating. The results, plotted in FIG. 3 show that for a Nd-CPFL, an increase in the spectral lasing width from 0.254 nm to 0.577 nm (127% increase) results in a decrease in the peak volume RIN of 10 dB.

As a second example, measurements designated Yb 1 were made on a similar Yb-CPFL laser using a narrow band grating (0.194 nm). Similar measurements designated Yb 2 were made using a chirped grating (0.776 nm). The decrease in the RIN for a change in the special lasing width of 0.23 nm to 0.30 nm (30% increase) was 12 dB.

II. Underlying Theory

While not necessary for the invention, the following constitutes applicants best current thinking concerning the theory underlying the invention.

The mean-square noise current, $<\Delta I^2>$, in a multimode laser can be written as:

$$<\Delta I^2> = 2e <I_{avg}> B_e + <I_{avg}>^2 \frac{B_e}{\Delta v} \quad (1)$$

where $<I_{avg}>$ is the average current produced at the detector and $\Delta v$ (approximated as the spectral width of the laser) is defined as:

$$\Delta v = \frac{(\int P(v)dv)^2}{\int P^2(v_0)dv} \quad (2)$$

Here P(v) represents the power spectral density of the laser and $P(v_0)$ is the peak power-spectral density. This expression assumes that the coherence area of the laser is equal to that of the detector, the laser electrical field has Gaussian noise statistics, the modes are independent of each other and thermal noise is negligible. The first term in Eq. (1) represents the shot noise, while the second term (sometimes called the excess photon noise) represents the beat noise between the different frequency components of the multimode laser. Comparing these two contributions to the noise process it is seen that when $$<I_{avg}> >> 2e\Delta v \quad (3)$$

the intermodal beat noise will dominate the noise process. To determine the limiting noise mechanism for our CPFL, the parameters in the above Table 1 were used.

Using Table 1, $<I_{avg}>$ can be calculated, and assuming that $B_0$ is equal to $\Delta v$, the inequality in Eq. (3) is satisfied (10 mA>>17 nA). This clearly indicates that the beat noise dominates the process in our CPFL. In order to estimate the number of modes involved, from Table 1 the longitudinal mode spacing is calculated to be 1.4 MHz. With a $B_0$ of 53 GHz there are approximately $37.9(10^3)$ longitudinal modes present that will mix with each other to produce the noise in the $B_e$. Given a $B_e$ of 150 MHz this means approximately 107 intermodal beat peaks may be present. Clearly beat noise will dominate.

Figure 4:
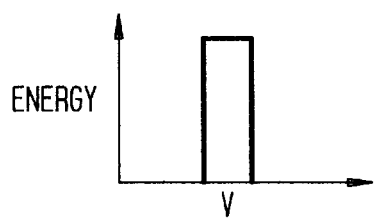
FIGS. 4 and 5 are heuristic diagrams useful in explaining the theory of the invention.
Figure 5:
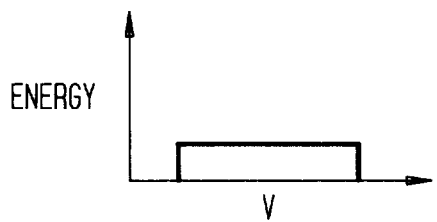

Equation (1) shows that increasing the optical bandwidth of the laser reduces the noise. The reason is illustrated heuristically in FIGS. 4 and 5 which schematically show the optical spectrum of two multimode lasers. In FIG. 4 the energy of the laser is concentrated in a few modes, and in FIG. 5 the energy is spread out over many modes. While the total power is the same in both figures, for FIG. 5 the broader spectrum means the energy per mode is less. Hence, the beating between any two modes in FIG. 5 will have smaller contribution to the noise process than in FIG. 4. In addition, we are concerned only with mixing that occurs between two modes whose frequency difference falls within a defined electrical bandwidth. By broadening the optical spectrum, the bandwidth over longitudinal mode beating occurs is increased and more modes are beating at frequencies outside the electrical bandwidth. The combination of the decrease in the energy per mode and the increase in the number of modes beating outside the electrical bandwidth of interest leads to a reduction in the intermodal beat noise.

In order to quantify the noise in the laser, two measures are used. The first is a signal-to-noise ratio (SNR). Where the ratio is defined for the electrical power of the detector. SNR is usually used to describe amplifiers where there is an input signal and noise added by the amplifier. In a laser however there is no "signal" per se. However, the average power value around which power fluctuations are taking place can be considered a signal power, while the power fluctuations are the noise value. In the literature the SNR has been defined as $$SNR = \frac{<I_{avg}>^2}{<\Delta I^2>}, \quad (4)$$

where $<\Delta I^2>$ is the mean-square current fluctuations of the detector.

In our work we do not strictly follow this definition. Instead of calculating the mean square current fluctuations, we use the square of the difference between the maximum and minimum value of the variation of the detector current from its average value as a measure of the noise.

A second more traditional measure of the noise content of a laser is the relative intensity to noise ratio (RIN) which is defined as $$RIN = \frac{<\Delta P^2(v)>}{P^2_{avg}} \quad (5)$$

where $<\Delta P^2(v)>$ is the mean-square optical intensity fluctuation at a frequency v in a 1 Hz bandwidth, and $P_{avg}$ is the average optical power. The SNR is used to quantify the total noise in the detector and the RIN to measure the spectral distribution of the noise. If white noise is assumed for both shot and beat noise, the RIN can be written by substituting Eq. (1) into Eq. (5) as:

$$RIN = \frac{2e}{<I_{avg}>} + \frac{1}{\Delta v} \qquad (6)$$

Where the proportionality between the square of the optical intensity and the electrical power has been used.

It is to be understood that the above-described embodiments are illustrative of only a few of the many possible specific embodiments which can represent applications of the invention. Numerous and varied other arrangements can be made by those skilled in the art without departing from the spirit and scope of the invention.

What is claimed:

1. In a rare earth-doped fiber multimode laser subject to intermodal beat noise comprising a length of optical fiber having a cladding and a rare-earth doped core, an input reflective coupler and an output coupler defining an optical cavity including said fiber, and a source of pumping energy, the improvement wherein:

said output coupler comprises a grating having a reflective spectrum with bandwidth in excess of 0.22 nm for reducing said intermodal beat noise by at least 3 dB.

2. The fiber laser of claim 1 wherein said output coupler is a chirped grating.

3. The fiber laser of claim 1 wherein said output coupler is a linearly chirped grating.

4. The fiber laser of claim 1 wherein said output coupler is a step-chirped grating.

5. The fiber laser of claim 1 wherein said output coupler has a bandwidth of at least 0.60 nm for reducing said intermodal beat noise by at least 10 dB.

6. The fiber laser of claim 5 wherein said output coupler is a chirped grating.

7. The fiber laser of claim 5 wherein said output coupler is a linearly chirped grating.

8. The fiber laser of claim 1 wherein said laser is a cladding-pumped fiber laser.

9. The fiber laser of claim 1 comprising a Nd-doped cladding-pumped fiber laser.

10. The laser of claim 1 comprising a Yb-doped cladding-pumped fiber laser.

* * * * *